(12) United States Patent
Holl et al.

(10) Patent No.: US 6,787,246 B2
(45) Date of Patent: *Sep. 7, 2004

(54) MANUFACTURE OF FLAT SURFACED COMPOSITES COMPRISING POWDERED FILLERS IN A POLYMER MATRIX

(75) Inventors: Richard A. Holl, Camarillo, CA (US); Philip L. Lichtenberger, Thousand Oaks, CA (US); Kenneth S. Yao, San Gabriel, CA (US)

(73) Assignee: Kreido Laboratories, Camarillo, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 09/973,290

(22) Filed: Oct. 5, 2001

(65) Prior Publication Data

US 2004/0151892 A1 Aug. 5, 2004

(51) Int. Cl.[7] .......................... B23K 35/36; B32B 7/02; C22C 32/00
(52) U.S. Cl. ....................... 428/548; 428/212; 428/213; 419/10
(58) Field of Search .................. 428/548, 212, 428/213; 419/10

(56) References Cited

U.S. PATENT DOCUMENTS

| | | |
|---|---|---|
| 591,494 A | 10/1897 | Pond |
| 2,261,257 A | 11/1941 | Kiesskalt et al. .......... 241/228 |
| 2,295,740 A | 9/1942 | Keen ........................ 261/93 |
| 2,314,598 A | 3/1943 | Phelan ....................... 62/114 |
| 2,474,006 A | 6/1949 | Maycock ................... 261/83 |
| 2,577,247 A | 12/1951 | Irwin ........................ 99/221 |
| 3,095,349 A | 6/1963 | Rich ........................ 162/236 |
| 3,215,642 A | 11/1965 | Levy ........................ 252/359 |
| 3,595,531 A | 7/1971 | Williams et al. ............... 259/7 |
| 3,841,814 A | 10/1974 | Eckhardt ................... 425/208 |
| 3,870,082 A | 3/1975 | Holl ........................ 138/40 |
| 4,000,993 A | 1/1977 | Holl ........................ 55/94 |
| 4,057,331 A | 11/1977 | Ong et al. .................. 350/285 |
| 4,071,225 A | 1/1978 | Holl ........................ 366/114 |
| 4,073,567 A | 2/1978 | Lakerveld et al. ........... 350/6.5 |
| 4,174,907 A | 11/1979 | Suh et al. .................. 366/279 |
| 4,198,383 A | 4/1980 | Konsetov et al. ........... 422/134 |
| 4,251,576 A | 2/1981 | Osborn et al. ............. 428/331 |
| 4,287,075 A | 9/1981 | Fujiwara et al. |
| 4,306,165 A | 12/1981 | Kitabayashi et al. .......... 310/59 |
| 4,311,570 A | 1/1982 | Cowen et al. ........... 204/157.1 |
| 4,315,172 A | 2/1982 | Intichar et al. .............. 310/53 |
| 4,335,180 A | 6/1982 | Traut |
| 4,405,491 A | 9/1983 | Sando et al. ................ 252/359 |
| 4,556,467 A | 12/1985 | Kuhn et al. ................ 241/193 |
| 4,593,754 A | 6/1986 | Holl ........................ 165/109.1 |
| 4,670,103 A | 6/1987 | Holl ........................ 165/109.1 |
| 4,708,198 A | 11/1987 | Holl ........................ 165/109.1 |
| 4,732,818 A * | 3/1988 | Pratt et al. .................. 428/547 |
| 4,744,521 A | 5/1988 | Singer et al. ................ 241/66 |
| 4,769,131 A | 9/1988 | Noll et al. .................. 210/85 |
| 4,778,631 A | 10/1988 | Cobbs, Jr. et al. .......... 261/128 |
| 4,784,218 A | 11/1988 | Holl ........................ 165/109.1 |
| 4,889,909 A | 12/1989 | Besecke et al. |
| 4,921,473 A | 5/1990 | Lee et al. .................... 494/27 |
| 4,930,708 A | 6/1990 | Chen ....................... 241/65 |
| 4,983,307 A | 1/1991 | Nesathurai ................. 210/748 |
| 5,100,736 A * | 3/1992 | London et al. ............. 428/549 |
| 5,154,973 A | 10/1992 | Imagawa et al. |
| 5,198,137 A | 3/1993 | Rutz et al. |
| 5,204,416 A | 4/1993 | Mercer et al. |
| 5,212,278 A | 5/1993 | Pfaendner |
| 5,227,637 A | 7/1993 | Herold et al. ............... 250/438 |
| 5,268,140 A | 12/1993 | Rutz et al. |
| 5,279,463 A | 1/1994 | Holl ........................ 241/1 |
| 5,300,019 A | 4/1994 | Bischof et al. ............... 604/4 |
| 5,335,992 A | 8/1994 | Holl ........................ 366/348 |
| 5,358,775 A | 10/1994 | Horn, III |
| 5,370,824 A | 12/1994 | Nagano et al. ............. 366/279 |
| 5,370,999 A | 12/1994 | Stuart ........................ 435/99 |
| 5,391,603 A | 2/1995 | Wessel et al. |
| 5,395,914 A | 3/1995 | Wilharm et al. |

(List continued on next page.)

FOREIGN PATENT DOCUMENTS

| | | | |
|---|---|---|---|
| DE | 299 02 348 | 4/1999 | .......... G02B/26/00 |
| DE | 299 19 570 | 1/2000 | .......... B29C/45/74 |
| EP | 0 219 357 | 4/1987 | .......... G02B/26/08 |
| EP | 0 660 336 | 6/1995 | .......... H01B/3/04 |
| GB | 891 152 | 3/1962 | |

(List continued on next page.)

OTHER PUBLICATIONS

US 6,159,264, 12/2000, Holl (withdrawn)
PCT International Search Report fot PCT/US00/18038, Holl Technologies Company, completed Sep. 17, 2000, mailed Oct. 6, 2000.
PCT International Search Report for PCT/US01/15258, Holl Technologies Company, completed Jan. 24, 2002, mailed Feb. 1, 2002.

(List continued on next page.)

Primary Examiner—Cynthia H. Kelly
Assistant Examiner—L. Ferguson
(74) Attorney, Agent, or Firm—Greenberg Traurig, LLP; Christopher Darrow, Esq (57) ABSTRACT

Composite materials, particularly those that are highly filled, e.g. comprising about 60 to 70 volume % of finely powdered filler material in a polymer matrix, are made by dissolving the polymer in a volatilisable solvent and forming a homogeneous mixture of the components by high shear mixing. The solvent is then removed while maintaining complete homogeneity in the mixture by evaporating much of the solvent in a high shear mill, then extruding an extremely thin film or tape (e.g. 0.0125 mm (0.0005 in)) from which the remaining solvent is removed by heating without introducing any appreciable non-uniformity, such as bubble holes. Required bodies are formed from the dried film or tape by stacking the thin coherent layers, typically about 6 to 120, then heating and pressing the stack in a mold melting the polymer, uniting the separate layers and dispersing the melted polymer into the interstices between the filler particles.

8 Claims, 3 Drawing Sheets

U.S. PATENT DOCUMENTS

| | | |
|---|---|---|
| 5,449,652 A | 9/1995 | Swartz et al. |
| 5,471,037 A | 11/1995 | Goethel et al. ............. 219/750 |
| 5,484,647 A | 1/1996 | Nakatani et al. ............ 428/209 |
| 5,506,049 A | 4/1996 | Swei et al. |
| 5,523,169 A | 6/1996 | Rafferty et al. ............. 428/551 |
| 5,538,191 A | 7/1996 | Holl .............................. 241/1 |
| 5,552,210 A | 9/1996 | Horn, III et al. |
| 5,554,323 A | 9/1996 | Tsukimi et al. .............. 264/4.7 |
| 5,558,820 A | 9/1996 | Nagano et al. .............. 264/4.1 |
| 5,576,386 A | 11/1996 | Kempter et al. ............. 526/88 |
| 5,658,485 A | 8/1997 | Cava et al. |
| 5,658,994 A | 8/1997 | Burgoyne, Jr. et al. ..... 525/390 |
| 5,659,006 A | 8/1997 | White |
| 5,674,004 A | 10/1997 | Takeuchi ..................... 366/69 |
| 5,693,742 A | 12/1997 | White et al. |
| 5,739,193 A | 4/1998 | Walpita et al. |
| 5,754,936 A | 5/1998 | Jansson |
| 5,855,865 A | 1/1999 | Lambert et al. ........... 424/9.52 |
| 5,874,516 A | 2/1999 | Burgoyne, Jr. et al. ..... 528/219 |
| 5,929,138 A | 7/1999 | Mercer et al. |
| 5,974,867 A | 11/1999 | Forster et al. ............. 73/61.41 |
| 5,998,533 A | 12/1999 | Weber et al. |
| 6,039,784 A | 3/2000 | Luk |
| 6,040,935 A | 3/2000 | Michalicek ................. 359/198 |
| 6,074,472 A | 6/2000 | Jachow et al. |
| 6,093,636 A | 7/2000 | Carter et al. |
| 6,134,950 A | 10/2000 | Forster et al. ............. 73/54.01 |
| 6,143,052 A | 11/2000 | Kiyokawa et al. |
| 6,176,991 B1 | 1/2001 | Nordman ..................... 204/601 |
| 6,190,034 B1 | 2/2001 | Nielsen et al. .............. 366/154 |
| 6,281,433 B1 | 8/2001 | Decker et al. ................ 174/35 |
| 6,391,082 B1 | 5/2002 | Holl ............................. 75/230 |
| 6,464,936 B1 | 10/2002 | Mowat et al. ................ 422/22 |
| 6,471,392 B1 | 10/2002 | Holl et al. ................... 366/279 |
| 2001/0030295 A1 | 10/2001 | Holl ....................... 250/492.23 |
| 2002/0038582 A1 | 4/2002 | Holl ............................ 75/230 |
| 2002/0078793 A1 | 6/2002 | Holl ............................ 75/230 |
| 2002/0089074 A1 | 7/2002 | Holl ............................ 261/92 |
| 2002/0148640 A1 | 10/2002 | Holl ........................... 174/256 |
| 2003/0043690 A1 | 3/2003 | Holl ........................... 366/279 |
| 2003/0066624 A1 | 4/2003 | Holl ............................ 165/47 |

FOREIGN PATENT DOCUMENTS

| | | | |
|---|---|---|---|
| GB | 1 232 644 | 5/1971 | ............ B02C/1/02 |
| GB | 1 252 192 | 11/1971 | ........... H02K/5/20 |
| GB | 2 192 558 | 1/1988 | ............ B01F/3/08 |
| JP | 58 144549 | 8/1983 | ........... H02K/1/18 |
| JP | 3 279991 | 12/1991 | ........... G09F/3/02 |
| JP | 11322920 A2 | 11/1999 | |
| JP | 11322920 | 11/1999 | .......... C08G/65/38 |
| JP | 2000-213876 | 8/2000 | .......... B29C/47/88 |
| SU | 369 939 | 4/1973 | .................... 241/1 |
| SU | 957 991 | 9/1982 | ................. 241/301 |
| SU | 1 737 241 | 5/1992 | ............ F27B/7/38 |
| WO | WO 97 12665 | 4/1997 | ............ B01F/5/00 |
| WO | WO 97 42639 | 11/1997 | ........... H01B/3/30 |
| WO | WO 98 49675 | 11/1998 | ........... G11B/5/09 |
| WO | WO 02 071451 | 9/2002 | |
| WO | WO 03 022415 | 3/2003 | .......... B01F/13/00 |

OTHER PUBLICATIONS

PCT International Search Report for PCT/ US01/20635, Holl Technologies Company, completed Jan. 24, 2002, mailed Feb. 1, 2002.

PCT International Search Report for PCT/US01/23657, Holl Technologies Company, completed Apr. 25, 2002, mailed May 6, 2002.

PCT International Search Report for PCT/US02/11575, Holl Technologies Company, completed Jul. 12, 2002, mailed Aug. 6, 2002.

PCT International Search Report for PCT/US02/29093, Holl Technologies Company, completed Mar. 6, 2003, mailed Mar. 17, 2003.

PCT International Search Report for PCT/US02/31076, Holl Technologies Company, completed Dec. 11, 1002, mailed Dec. 27, 2002.

PCT International Search Report for PCT/US02/05361, Holl Technologies Company, completed May 17, 2002, mailed Jun. 5, 2002.

US 6,159,264, Dec. 2000, Holl (withdrawn).

www.pooleplastics.com/production.html, Poole Plastics and Tooling Company, Production Capabilities; Feb. 15, 2001.

Zlotorzynski; "The Application of Microwave Radiation to Analytical and Environmental Chemistry;" Critical Reviews in Analytical Chemistry; vol. 25, No. 1; pp. 43–76; 1995.

"Microwave Heating Mechanisms;" Microwave Chemistry.

"A Basic Introduction to Microwave Chemistry;" Microwave Chemistry.

"Fast and Furious;" Microwave Chemistry.

"Microwave Heating Applied to Polymers;" Microwave Chemistry.

"Application of Microwaves to Organic Chemistry;" Microwave Chemistry.

"Microwave Chemistry in Liquid Media;" Microwave Chemistry.

"Microwave Heating and Intercalation Chemistry;" Microwave Chemistry.

* cited by examiner

MANUFACTURE OF FLAT SURFACED COMPOSITES COMPRISING POWDERED FILLERS IN A POLYMER MATRIX

BACKGROUND OF THE INVENTION

1. Technical Field

The invention is concerned with methods for the manufacture of composite materials consisting of finely powdered filler in a polymer matrix, and new composite materials made by such methods. It is concerned particularly with methods for the manufacture of such composite materials having very flat surfaces suitable for the reception of electrical conductors, and with such flat surfaced products made by such methods.

2. Background Art

The electronics industry is an example of one which makes substantial use of flat surfaced substrates as supports for electronic circuits, such substrates consisting of thin flat pieces produced to exacting specifications as to starting material and physical and electrical properties. The history of the industry shows the use of progressively higher operating frequencies and currently for frequencies up to about 800 megahertz (MHz) copper coated circuit boards of glass fiber reinforced polymers, such as epoxies, cyanide esters, polytetrafluoroethylene (PTFE) and polyimides, have been and are still used. For frequencies above 800 MHz the current materials of choice are certain ceramics formed by sintering suitable powdered inorganic materials, such as silica; alumina; aluminum nitride; boron nitride; barium titanate; barium titanate complexes such as $Ba(Mg_{1/3}Ti_{2/3})O_2$, $Ba(Zr,Sn)TiO_4$, and $BaTiO_3$ doped with $Sc_2O_3$ and rare earth oxides; alkoxide-derived $SrZrO_3$ and $SrTiO_3$; and pyrochlore structured $Ba(Zr,Nb)$ oxides. Substrates have also been employed consisting of metal and semiconductor powders embedded in a glass or polymer matrix, a particular preferred family of polymers being those based on PTFE.

For example, ceramic substrates that have been used for hybrid electronic circuit applications comprise square plates of 5 cm (2 in) sides, their production usually involving the preparation of a slurry of the finely powdered materials dispersed in a liquid vehicle, dewatering the slip to a stiff leathery mixture, making a "green" preform from the mixture, and then sintering the preform to become the final substrate plate. The substrates are required to have high values of uniformity of thickness, grain size, grain structure and density, with the purpose of obtaining substantially uniform dielectric, thermal and chemical properties, and high values of surface flatness and surface finish to permit the uniform application to the surfaces of fine lines of conductive or resistive metals or inks.

Such sintered products inherently contain a number of special and very characteristic types of flaws. A first consists of fine holes created by the entrainment of bubbles in the ceramic pre-casting slip of sizes in the range about 1–20 micrometers; these bubbles cannot be removed from the slip by known methods and cause residual porosity in the body. As an example, sintered alumina substrates may have as many as 800 residual bubble holes per sq/cm of surface (5,000 per sq/in). Another flaw is triple-point holes at the junctions of the ceramic particles when the substrate has been formed by roll-compacting of spray-dried powder; they are of similar size to the bubble holes and appear in similar numbers per sq/cm. Yet another consists of "knit-lines", which are webs or networks of seam lines of lower density formed at the contact areas between butting particles during cold pressing. Two other common flaws are caused by inclusions of foreign matter into the material during processing, and the enlarged grains caused by agglomeration of the particles despite their initial fine grinding. The usual inclusions are fine particles due to abrasive wear of the grinding media in the mills. Both inclusions and agglomerates will sinter in a matrix at a different rate from the remainder of the matrix and can result in flaws of much greater magnitude than the original inclusion or agglomerate.

Costly mirror-finishing by diamond machining and lapping of these prior art ceramic surfaces is required to allow the accurate deposition of sputtered metal layers from which conductor lines are formed by etching. Mirror-finishes are required because the electrical currents at frequencies above 0.8 GHz move predominantly in the skin of a conductor line, while in the lower frequencies they occupy the entire cross-section. The thickness of the skin through which currents move at GHz frequencies becomes thinner as frequencies rise and are already as thin as 1 to 2 micrometers in copper at around 2 GHz. Any surface roughness of the conductors will therefore contribute to conductive losses. For example, at a frequency of 4 GHz, the conductive loss at of the interface between conductor and substrate is 1.65 times higher with an RMS roughness of 40, compared to an RMS roughness of 5 (See P.42 of Materials and Processes for Microwave Hybrids, R. Brown, published 1989 by the International Society for Hybrid Microelectronics of Reston, Va.)

There is therefore continuing interest in methods for manufacturing composite materials for the production of electronic substrates with which the major surfaces are as flat as possible, while sintering and its attendant difficulties, and the considerable costs of diamond machining and lapping are avoided.

DISCLOSURE OF THE INVENTION

The principal object of the invention is therefore to provide new methods for manufacturing composite materials consisting of particles of finely powdered filler material bonded together in a matrix of polymer material, such new composite materials, and articles made from such composite materials, wherein such materials and articles can more readily be produced with surfaces of the flatness demanded by the electronics industry.

It is another object to provide such new methods with which the resultant composite materials and articles comprise at least 60 percent by volume of filler material, with the remainder consisting of polymer matrix, wherein again such materials and articles can readily be produced with surfaces of the flatness demanded by the electronics industry.

It is a further object to provide such new methods which are operable to produce composite materials and articles comprising at least 60 percent by volume of filler material, with the remainder consisting essentially of polymer matrix, wherein again the materials are produced in a form with which the surfaces intended for the reception of electric conductors and the like are inherently readily producible with surfaces of the flatness demanded by the electronics industry.

In accordance with the invention there are provided methods for the manufacture of composites of finely powdered fillers in a polymer matrix comprising the steps of:

forming a solution of the polymer in volatilizable solvent;

mixing filler material particles with sufficient solution to form a suspension having therein the balance in volume percent of the polymer required for the composite;_ evaporating solvent from the suspension while subjecting it to high shear treatment so as to maintain high values of uniform distribution of filler particles in the solution, the evaporation being continued until a mixture is obtained consisting essentially of filler particles with the residual solution distributed substantially uniformly therein, the mixture being of consistency suitable for production of thin coherent layers;

producing thin coherent layers from the mixture; continuing evaporation of solvent from the thin coherent layers until it has substantially entirely been removed;

placing a stack of a plurality of the thin coherent layers in a mold in sufficient number to obtain a composite article of the desired thickness; and subjecting the stack of thin coherent layers to a temperature sufficient to melt the polymer material and to a pressure sufficient to unite the layers and to maintain the melted polymer material substantially uniformly dispersed in the interstices between the filler material particles.

Also in accordance with the invention there are provided articles consisting of bodies of composite materials comprising finely powdered filler material particles substantially uniformly distributed in a polymer matrix;

wherein each body comprises a composite mixture of filler material particles and the balance polymer, the polymer being soluble in a volatizable solvent that has been volatilized from the mixture;

wherein each body comprises a stack of a plurality of united thin coherent layers in number sufficient to provide a body of the desired thickness; and wherein the body has been formed from the stack of thin coherent layers by subjecting the stack to a temperature sufficient to melt the polymer and to a pressure sufficient to unite the layers and disperse the melted polymer into the interstices between the filler material particles to a high degree of uniformity.

BRIEF DESCRIPTION OF THE DRAWINGS

Methods and apparatus for the production of the new composite materials, new composite materials, and articles made of such new composite materials, produced using such methods and apparatus, that are particular preferred embodiments of the invention, will now be described, by way of example, with reference to the accompanying diagrammatic drawings wherein.

DETAILED DESCRIPTION OF THE PREFERRED EMBODIMENTS

We have discovered new methods for the production of useful composite materials with high loadings of finely divided filler materials that are set out in detail in my applications Ser. Nos. 09/345,813 and 09/802,037, the disclosures of which are incorporated herein by this reference, so that extended repetition thereof is not required. The products of the present invention do not inherently require such high filler loadings as are possible with the application of those methods, but it is sufficiently advantageous to employ the methods involved in their production that the present invention is described as making use of them.

Briefly, the new methods for enabling high filler loadings require a complete reversal of approach from that which has previously been employed in the production of composite materials. A major problem in the prior art processes, and in the materials and substrates obtained thereby, is the progressive loss of mechanical strength that results as the filler solids content is increased, and hitherto attempts to incorporate more than about 40 volume percent generally has resulted in composites which are so friable that they literally collapse to a heap of sand-like material if in testing they are stressed to the degree required in commercial practice. Moreover, it has been found difficult with prior art processes even to incorporate as much as 40 volume percent solids material, since as the material is added to the polymer the mixtures become so viscous that mixing to keep them uniform becomes virtually impossible. Consequently, the approach has of necessity been to incorporate only as much filler material as will result in a product of adequate mechanical strength, and to accept lower values for the desired other characteristics, such as the electrical characteristics, that result.

The successful production of highly filled composite materials requires the solids content must instead be increased to values well beyond those of the conventional prior art. An acceptable minimum for these new composite materials is 60 volume percent. It has been found unexpectedly that the mechanical strength increases with increased solids content, instead of decreasing, up to the value of about 95–97 volume percent, beyond which value the proportion of polymer is reduced below the minimum required to maintain adequate adhesion between the polymer and the filler particles. A possible explanation for this unexpected result is that with the very thin polymer films that result, even if the chosen polymer is inherently not particularly mechanically strong, a successful composite will be produced if the polymer exhibits sufficient mechanical strength and also sufficiently high adhesion toward the filler material. Thus, in the new methods the polymers are employed in the form of very thin adherent layers interposed between the filler particles, and such layers can only be obtained with the methods of the invention and when the solids content is sufficiently high. It is difficult to specify with any degree of accuracy the optimum thicknesses for the polymer layers; it is known that layers of 1–3 micrometers can be very successful in giving superior adhesion with adequate strength, and a possible upper limit is 40 micrometers (0.001 in).

The highly loaded composite materials are made by dissolving the required portion by weight, or by volume, of the chosen polymer material in a solvent, which must be removably volatilization, in which it is sufficiently soluble that a flowable solution is obtained which can form a homogeneous mixture with the corresponding portion by weight or by volume of the chosen filler material, which should be of sufficiently small dimension, or equivalent spherical diameter, e.g. in the range 0.1 to 50 micrometers. By equivalent spherical diameter is meant the diameter of a completely spherical particle having the same volume as the specified particle. Once such a homogeneous filler/solution mixture has been obtained the solvent is removed in a manner which does not destroy the homogeneity of the mixture, so that it can then be subjected to a temperature sufficient to melt the polymer material, e.g. in the range 280–400° C. and to a pressure, e.g. in the range 3.5 to 1,380 MPa (500 to 200,000 psi), preferably 70 to 1,380 MPa (10,000 to 200,00 psi), sufficient to disperse the melted polymer material into the interstices between the particles of filler material. Very suitable filler materials are selected from the group comprising particles of inorganic material, particles of electromagnetic material, particles of a core of inorganic material covered with a layer of a metal oxide material, particles of metal material, particles of magnetic material, and particles of low dielectric constant high melting point polymer material, all of which particles may be hollow.

The resultant heated and pressurized composite mixture may be formed into a sheet, film or tape by a thermoplastic extrusion process, onto a surface of which a layer of conductor forming metal, usually copper, may be applied, either by sputtering or by direct bonding of foil under heat and pressure in a vacuum. Alternatively, green "preform" bodies can be cut from sheet or tape before the heat and pressure step, and these green bodies converted to heated and pressed bodies by a thermoplastic compression process, again to a surface of which a layer of copper or other suitable conductive material for the formation of electrical conductors can be applied by sputtering or by direct bonding of foil under heat and pressure in a vacuum. The resultant bodies may comprise substrates for electronic circuits or enclosures for electronic circuits or devices, and when so employed must have surfaces that are as flat as possible so that the copper layer is also as flat as possible. The methods of the present invention facilitate the formation of sufficiently flat surfaces to which such metal layers are applied and also, by permitting an increase in the speed with which the volatilization can be completed, provide an overall increase in the speed of production.

With microelectronic devices, and with the higher frequencies now employed, the problems of adequate uniformity of physical and chemical constitution and physical and electrical properties of the substrates have been exacerbated, and the simple mixing methods that have been used hitherto generally will not provide sufficient uniformity, especially during the unusually difficult step of removing the volatile solvent as rapidly as possible without damaging or even destroying the homogeneity of the mixture while it is drying, and it usually becomes necessary to employ high shear mixing methods and apparatus, as described in detail below.

Figure 1:
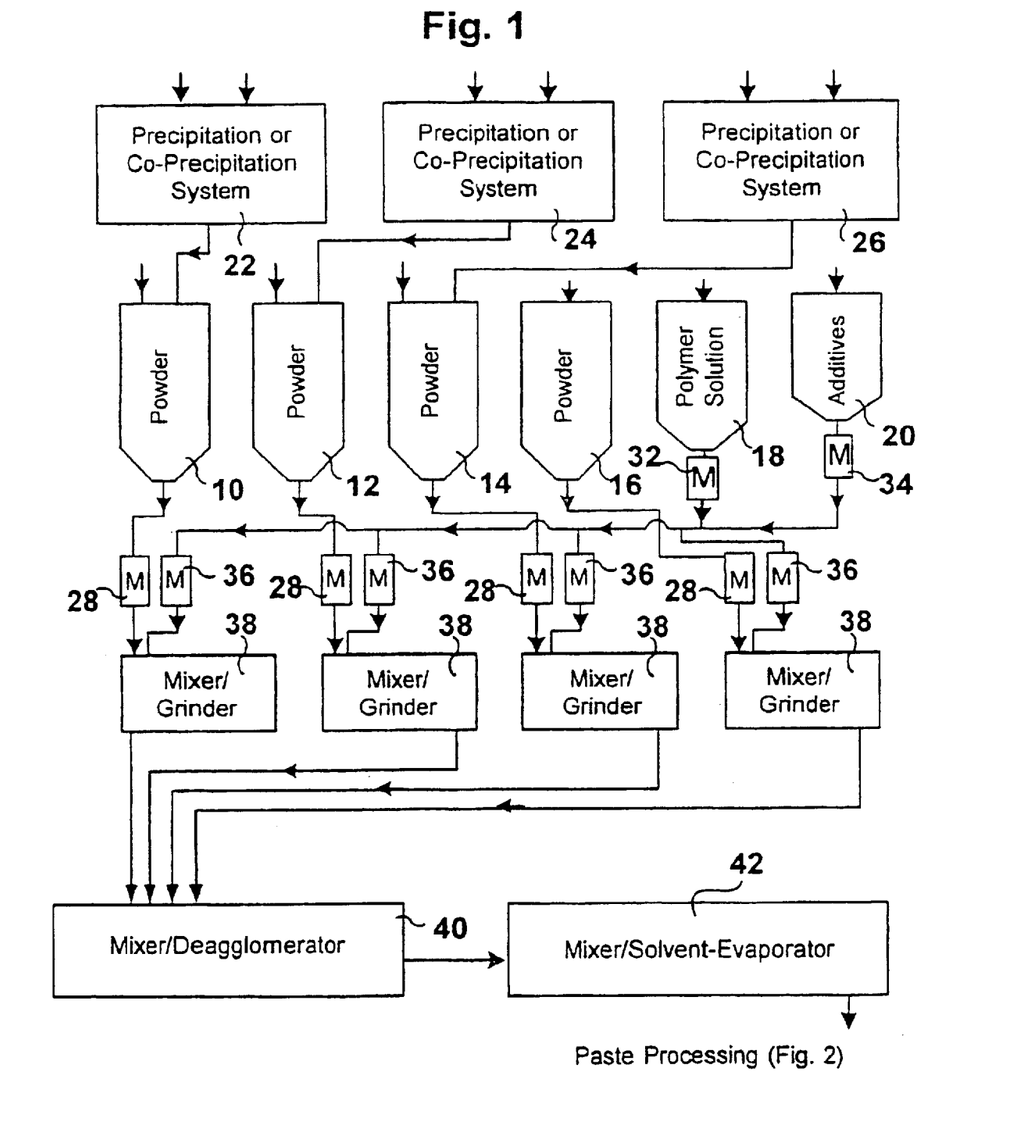
FIG. 1 is the first part of a block flow diagram of the specific method and apparatus for the manufacture of the composite materials and articles of the invention, particularly for the manufacture of flat rectangular copper clad substrates intended for use for electronic circuits.

Referring now to FIG. 1, the apparatus to be employed for this particular process permits a mixture of different filler materials to be used, thus providing the opportunity of specifically tailoring the mechanical and electrical characteristics of the resultant substrates for the end product. The polymer is added in the form of a solution thereof, usually of about 5–40% concentration depending upon the solubility of the chosen polymer in the preferred solvent. The solution must be sufficiently fluid for the subsequent mixing with the filler material and should therefore be at least of "syrupy" consistency. The solvent that is chosen needs to be capable of economical and safe volatilization from the solution after mixing with the filler material. This solvent is also used as a liquid dispersion and suspension vehicle for the filler particles. With this apparatus separate preliminary mixtures are first formed of each of the finely powdered filler materials, usually inorganic materials, with respective portions of the polymer solution, the separate mixtures then being combined into one. The filler material or mixture of materials may be obtained respectively by precipitation or coprecipitation from solutions of suitable precursors, and however obtained should have the required physical and/or chemical characteristics, such as purity, dielectric constant, loss tangent, and particle size distribution. In this embodiment up to four different powdered materials can be fed from a delivery and metering system comprising a plurality of hoppers 10, 12, 14 and 16 respectively, while the polymer solution is fed from its hopper 18, and suitable surface active functional additives, if required, such as surfactants, plasticizers and lubricants, are fed from a respective hopper 20.

Each powdered material can be fed directly into the respective hopper 10, 12, 14, and 16, or alternatively obtained from respective precipitation or coprecipitation systems 22, 24, or 26; a coprecipitation system for the contents of the hopper 16 is not shown. The flow of each filler powder from its hopper is continuously precision metered by a respective meter 28, that of the polymer solution is metered by meter 32, that of the surface active additives is metered by meter 34, and those of the combined polymer solution/filler or additive flows are metered by respective meters 36. Each preliminary mixture of polymer solution, powders and additives is delivered into a respective drum-type high shear mixer/grinding mill 38, described in more detail below.

One of the aspects of the processes for the production of highly filled composites that also distinguishes them from prior art processes is that it is preferred to use low cost powders of a relatively wide range of particle sizes in order to obtain optimum packing together of the particles, and resultant minimization of the thickness of the interposed polymer layers, as contrasted with the highly uniform size, and consequently expensive, powders which are required, particularly for the production of fired ceramic substrates to achieve adequate uniformity of processing. Prior to the formation of each mixture the respective powder particles usually consist of particles of a range of sizes, together with agglomerates of many finer particles that inevitably form during storage, etc., and that can vary even more widely in size, and this must be corrected, particularly the reduction of the agglomerates back to their individual particles. Each high shear mixer/mill 38 operates to mix the components and produce complete dispersion of the powdered material in the liquid vehicle, and also as a grinding mill to mill the respective powder particles and agglomerates to a required size distribution to a obtain a required degree of uniformity, but with a distribution that will also result in a minimum pore volume when compacted.

Since highly filled composites are to be produced the proportions of the powder and polymer solution from the hoppers are such as to obtain a solids content in the respective preliminary mixture in the range of 40–95% by volume, the quantities of the dispersing vehicle (the solvent in this example) being kept as low as possible, but sufficient for the consistency of the mixture to be kept to that of a relatively wet paste or slurry, to permit its high shear mixing and grinding while flowing sufficiently freely through the relatively narrow processing flow passages of the respective mill 38, and the subsequent machines. A viscosity in the range of about 100–10,000 centipoises will usually be satisfactory. Preferably such grinding, deagglomeration and dispersion of each preliminary mixture is carried out simultaneously in its respective mill 38, using for this purpose a special high shear mill which is the subject of my U.S. Pat. No. 5,279,463, issued 18 Jan., 1994, and U.S. Pat. No.

5,538,191, issued 23 Jul., 1996, the disclosures of which are incorporated herein by this reference. These special mills may be of two major types, in a first of which the mill has two circular coaxial plate members with a processing gap formed between them; the axis of rotation can be vertical or horizontal. It is preferred however to use the second type of mill, which consists of an inner cylindrical member rotatable about a horizontal axis inside a stationary hollow outer cylindrical member. Such apparatus is capable of processing relatively thick slurries of sub-micrometer particles in minutes that otherwise can take several days in conventional high shear mixers and ball or sand mills. It should be understood that although mill 38 is preferably the special high shear mill as disclosed and/or claimed in the patents identified above, other types of high shear mills or mixing apparatus may be employed, a few examples of which are included in said patents (for example, see U.S. Pat. No. 5,553,191 at column 2, lines 4–30 and column 5, lines 18–34), provided that the proper operational and functional parameters discussed herein may be achieved by such other mills.

The mixture of separate preliminary mixtures is formed into a slurry or wet paste having a high degree of uniformity by passing them together into a mixer/deagglomeration mill 40, in which the combined mixture is subjected to another high shear grinding, deagglomerating and dispersing operation. The mill 40 is again one of the above-mentioned special mills which are the subject of my U.S. Pat. Nos. 5,279,463 and 5,538,191, being also of the type comprising an inner cylindrical member rotatable inside a stationary hollow outer cylindrical member. Although only a single mill 40 is employed in this embodiment, in some processes it may be preferred to employ a chain of two or more such mills depending upon the amount and rate of grinding, deagglomeration and mixing that is required.

The mixed and milled slurry passes from the mill 40 to a high shear mixer/solvent evaporation mill 42 (see FIGS. 2 and 3) which again is of the type comprising an inner cylindrical member 44 rotatable inside a stationary hollow outer cylindrical member 46, the paste being carried on the outer cylindrical surface of the member 44 in the form of a thin film 47. In this mill most of the solvent is removed while the paste is vigorously mixed under high shear conditions that continuously renews the outer surface to ensure that the thickening material remains homogeneous despite the progressive removal of the solvent, such removal requiring that solvent move from the body interior to its exterior surface from whence it can evaporate. Without such vigorous high shear mixing and constant outer surface renewal the mixture would rapidly become more and more inhomogeneous as the solvent escapes from the outer surface. The paste thus becomes continuously thicker as it travels in a helical path from the feed entry point 48 of the mill to its discharge outlet 50 as more and more solvent is withdrawn through solvent discharge outlet 52, from which it passes to a condenser (not shown) for recovery and reuse. At some stage in the solvent removal the mixture may be regarded as having changed phase, so that it no longer comprises filler material uniformly distributed in solution, but instead comprises essentially filler material in which the remaining solution is substantially uniformly distributed. The evaporation of the solvent is facilitated by heat from a row of cartridge heaters 54 in the base of the machine, their output being such as to obtain a temperature in the mixture body of about 150° C.

Figures 2, 3:
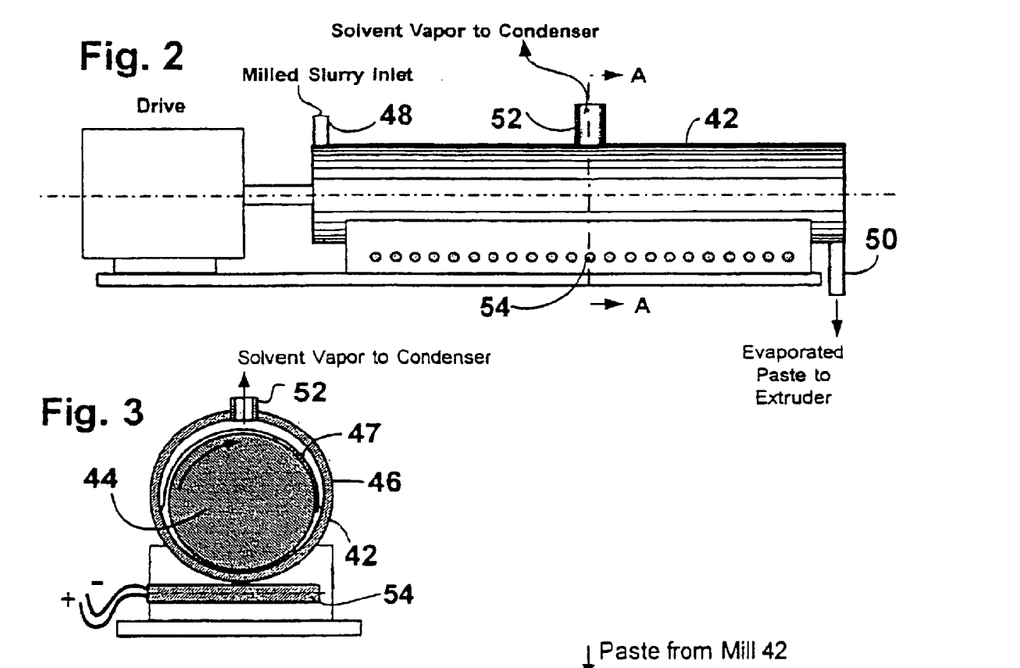
FIG. 2 is side elevation of a mixer/solvent evaporation mill shown in outline in FIG. 1.
FIG. 3 is a cross-section through the mill of FIG. 2, taken on the line A—A therein.
Figure 4:
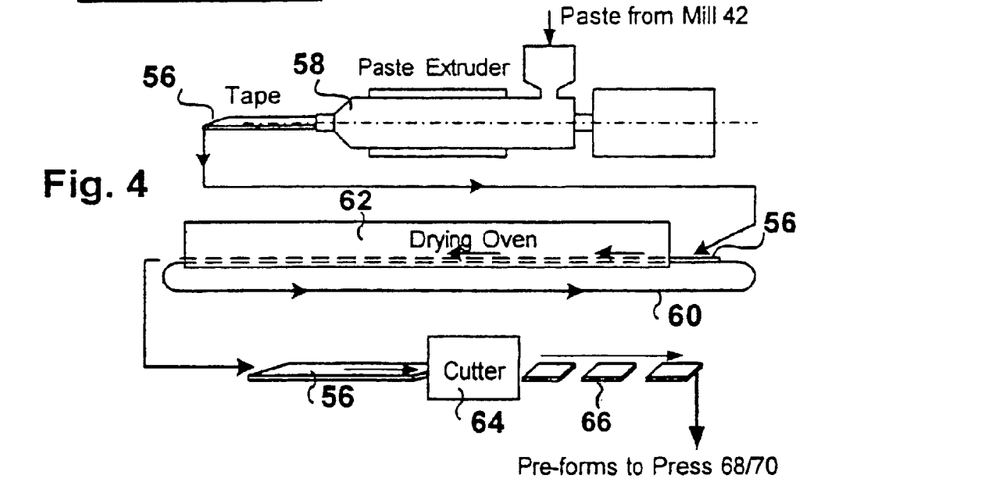
FIG. 4 is another part of the block flow diagram, continuing from FIG. 1.

Near to the discharge outlet 50 the paste is of sufficient stiffness that it can be extruded in the form of a coherent thin tape 56 (or sheet or strip depending upon what is required for the final product) of the desired dimension in thickness and width using a conventional paste extruding machine 58. Since this tape still contains small amounts of solvent, and possibly some residual additives, it must be subjected to a further heating, drying process, at least until all of the solvent has been removed. In the processes of the invention the thickness of the tape, etc. exiting from the extruder is independent of the thickness of the final substrates, and is as thin as can be made while still remaining coherent in order to facilitate this stage of the evaporation, so that the speed of solvent removal can be maximized, correspondingly increasing the overall speed of production, without disturbing the high degree of uniformity in distribution of the particles in the polymer matrix.

At this stage of the production there is no possibility of mixing and surface renewal to facilitate the escape of the volatilizing solvent, and instead it must escape via the much slower process of diffusion through the body of the tape. Such processes are not particularly temperature sensitive, and attempts to speed them by increasing the temperature to which the tape is subjected are limited by the possibility of overheating, and also by the extra cost of operating at such elevated temperatures. By making the tape as thin as possible while still remaining coherent the speed of drying is increased by a factor that far outweighs the fact that subsequently a substantial plurality of the strips must be stacked together, one on the other, to achieve the thickness required for the substrate. Owing to this extreme thinness the solvent escapes easily and rapidly from the interior of the body through the two opposed larger surfaces without producing any substantial change in homogeneity of the ongoing tape. The strip can be so thin that while coherent it is necessary to support it as it exits from the extruder. At this time a preferred practical range of values for the thickness is from 0.0125 mm (0.0005 in) to 0.0375 mm (0.0015 in), and it is preferred that the thickness should not be more than 0.1 mm (0.004 in), so as to ensure that this advantageous extremely fast drying process is maximized. The simplest equipment for this purpose is a tunnel dryer oven, and to this end the tape is deposited on an endless conveyor 60, which passes it through a drying oven 62, during which passage not only the solvent but as much as possible of the additives are removed to leave the strip or tape consisting only of a dry, thoroughly and generally uniformly dispersed composite mixture of the filler material and polymer. A suitable temperature for such an oven is, for example, in the range 150–250° C.

Figure 5:
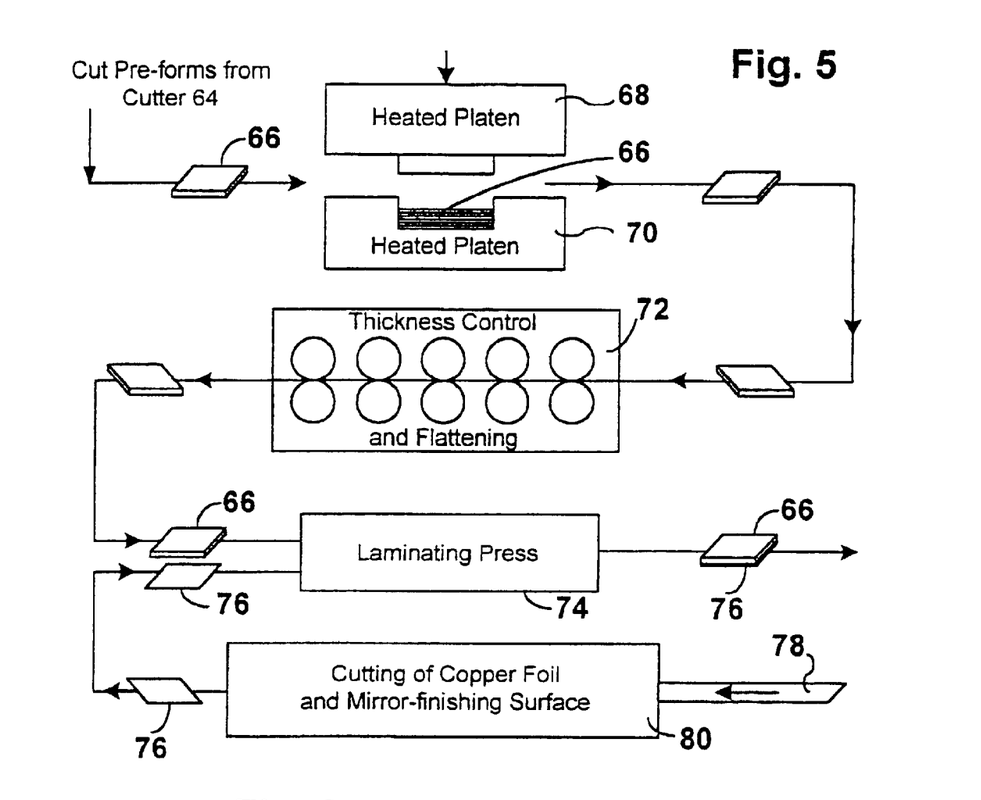
FIG. 5 is a further part of the block flow diagram, continuing from FIG. 4.

The tape 56 of dried paste is passed through a cutting station 64, in which it is severed into individual "green" substrate preforms 66, usually of rectangular shape and of the size required for the electronic circuit board substrate, if that is the use for which the materials are intended. At this time a typical commercially feasible minimum thickness for electronic substrates is about 0.075 mm (0.003 in), the value chosen being determined by a number of factors including the frequency of operation of the circuit and the dielectric constant of the filler material. With the preferred current value for the thin strip the stack will need at least 6 preforms to form the final substrate, absent any loss in thickness during the heating and pressing operation. The range of number required for the stack will usually of the order of from 6 to 60. The stack is formed by deposition of the requisite number of performs manually or automatically into the cavity of a heated compression mold comprising heated upper and lower platens 68 and 70, the cavity being located in the lower heated platen 70 to facilitate the loading process. Once the stack is loaded the mold cavity is closed by the downward moving heated top platen 68 which protrudes into the cavity to compress the stack to its required dimensions and density. If desired a final volatilization and degassing can take place by applying a vacuum to the interior of the mold as and after it is closed. The temperature to which the stack is heated in the mold is sufficient to melt the polymer so that it will flow as freely as possible under the pressure applied to completely fill the interstices, fuse the separate elements of the stack together into a unitary body, and coat the filler material particles, while the maximum is that at which the polymer will begin to degrade unacceptably. The minimum pressure to be employed is coupled with the choice of temperature, in that it must be sufficient for the melted polymer to flow as described, the pressure and time for which the mold is closed being sufficient for the material of the stack to attain maximum compaction and density. During the heat and pressure cycle the melted polymer will flow relatively freely and the temperature and pressure are maintained for a period sufficient to ensure that the polymer can completely fill the relatively small interstices between the solid particles in the form of correspondingly very thin coherent layers. Typically the temperature is in the range 280–400° C., while the pressure is in the range 70 MPa to 1,380 MPa (10,150 to 200,000 psi), although a more commercially likely pressure is about 345 MPa (50,000 psi), while pressures as low as 3.5 MPa (500 psi) may be usable. The surfaces of the platens that contact the preforms are mirror-finished or better to assist in obtaining the smooth surfaces that are desired for electronic substrates intended for microwave frequency applications.

The maximum temperature that can be used is a positive barrier that cannot be overcome because of the damage that will be done to the polymer if it is exceeded. The maximum pressure that can be applied is limited principally by the size of the press that is available, and the strength of the material that can be used for the mold platens. Thus, if the pressure is increased too much it may be the mold parts that will begin to flow and distort, and not the mold insert. High pressure presses are expensive to purchase and to maintain, and tend to be slower in operation as their capacity increases because of the need to build up to the very high pressure that is employed. It has been found in practice that although it is possible to obtain with reasonable pressures the desired flow of the polymer into the interstices between the filler particles, it is more difficult to ensure adequate radial flows at the interfaces between the preform and platen surfaces, such flows being required so that the surfaces of the finished substrates will truly assume the flatness and mirror finish of the platen surfaces, and not be left with some residual unflatness. It is inherent with such heavily filled composites that the packing density across the boundary portions is unlikely to be uniform, and it is necessary to try to ensure that areas of high packing density do not, after the pressing operation, show up as excrescences from the remainder of the surfaces. The use of a stack of a plurality of extremely thin coherent layers in place of a single insert facilitates such radial flows and ensures the conformation of the mold insert surfaces to those of the platens to the extent that smaller pressures can be used with correspondingly faster and more effective production.

The resulting fused, multi-layered but unitary substrates 66 issuing from the press are fed to a multi-stand, heated, flattening roller mill 72 in which they are flattened while being rolled to an accurately controlled thickness that will maintain their molded thickness. The surfaces of these rolls are also mirror-finished, or better, again in order to maintain the smooth, flat surfaces that were obtained in the mold. Substrates intended for use in electronic circuits will usually be of thickness in the range 0.075 mm to 1.5 mm (3–60 mil), and substrates of these dimensions will require from about 6 to 120 of the thinnest coherent layers in the corresponding stacks. If intended for thick film usage they usually are required to be smooth to about 0.75–0.90 micrometer (22–40 microns), while if intended for thin film usage must be flat to better than 0.05 micrometer (2 microns). The preforms are now fed to a heated laminating press 74 in which they are each laminated on one or both sides with a thin flat smooth piece 76 of the same size, of a conductive metal, usually copper, which subsequently is etched to produce the electric circuit. These sheet copper pieces are obtained by cutting from a strip 78 supplied from a roll thereof (not shown) which is cut into pieces at a cutting and mirror-finish surfacing station 80. The surfacing means comprises a hot press in which the cut pieces are pressed between a pair of heated platens, the platen surfaces being mirror-finished or better so that a corresponding finish is imparted to the surfaces of the pieces. The mirror-finishing of the substrate surfaces and those of the copper pieces is especially important in ultrahigh-frequency applications since, as described above, the currents tend to flow only in the surface layers of the conductors, and uniformity in characteristics of the etched conductors is facilitated by such smooth surfaces.

The process and apparatus described above are particularly suited for high volume production of composite materials, but simpler processes requiring less apparatus are also within the scope of the invention. For example, as described above, it is also possible to mix together the finely divided filler material, the polymer, the solvent, and any necessary additives, and thereafter rely upon high shear processing in one or a series of high shear mixer/mills 38 and/or 40 to produce the required thorough dispersion, while at the same time obtaining the preferred range of particle sizes, the dispersed mixture that is produced thereafter being passed to the mixer/solvent evaporator 42, the paste extruder 58 or its functional equivalent, and the drying oven 46 etc., as with the prior process.

Figure 6:
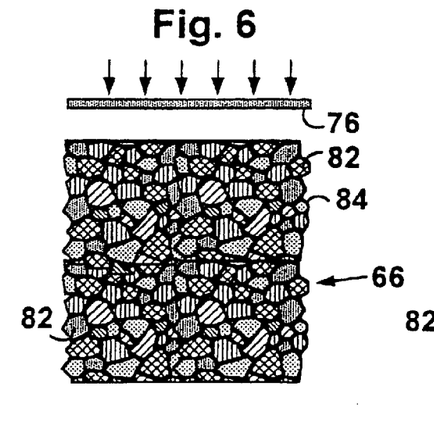
FIGS. 6 and 7 are respective part cross sections to a greatly enlarged scale through a small piece of a typical material of the invention in order to show the grain structure thereof, and showing respectively a layer of metal in position to be applied to a surface, and applied to the surface.
Figure 7:
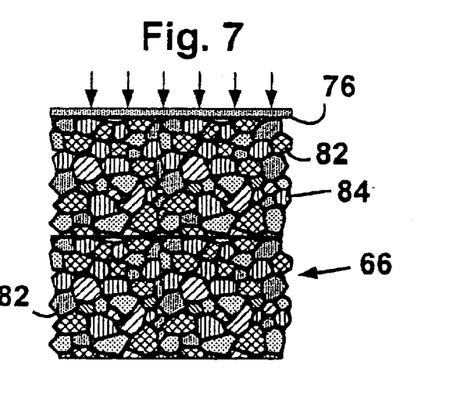

FIGS. 6 and 7 are respective photo micrograph cross sections through a highly loaded material, respectively before and after the mirror finished piece 76 of copper sheet is attached to the mirror-finished surface of the substrate, the material consisting of closely packed particles 82 of the filler material, of irregular size and shape, coated and bound together by polymer material 84 that now exists as thin intervening films and interstice-filling masses. The heating and pressing operation will have so completely fused together the separate layers that they are no longer distinguishable as such. As an indication of the size of the particles, etc. involved the square section of FIG. 6 measures 5 micrometers each side. The adhesiveness of the polymers of the invention are sufficient to ensure adequate bonding without the need for reinforcing fibers or fiber-cloth.

As has been set out above, the selection of the polymer or polymer mixture for use in the methods and products of this invention depends, apart from the usual commercial considerations of cost and ready consistent availability, principally upon the availability of a correspondingly readily available solvent that can economically and safely be volatilized back out of the filler/solution mixture, and also upon the polymer or polymers exhibiting sufficient adhesion toward the finely divided filler material to be able to form a composite of the required minimum flexural strength of about 17 MegaPascals (2,500 psi). There is usually no requirement for an upper limit to the flexural strength and values of 124.2 Mpa (18,000 psi) have already been obtained for silica/PAE composites and 144.2 Mpa (20,900 psi) for alumina/PAE composites. For example, many polymers are soluble in mineral oils, which are insufficiently volatile under the maximum heating conditions to which the mixtures can be subjected without serious degradation of the polymer mechanical properties. A very desirable filler material for electronic applications is boron nitride, but this is so difficult to bond to that it is commonly used as a mold release agent, and it is correspondingly difficult to find suitable polymer/solvent combinations for use with it.

The relative proportions of the filler materials and of the polymer depend at least to some extent upon the use to which the substrate is to be put. If a very high frequency circuit is to be installed then it will be preferred to have the maximum amount of filler dielectric material and the minimum amount of polymer. As has been described above, the minimum amount of polymer is set by that required to fill the intergrain interstices when the interstitial volume is at its minimum value, and to ensure sufficient coating of the grains for the resulting composite to have the required mechanical flexural strength. For this reason the composites usually require a minimum of 3% by volume of polymer to be present as long as the optimum particle packing of the filler material has been obtained, the remaining 97% solids content comprising the filler dielectric material, residual surface active and coupling agents if any, and organic or inorganic reinforcing, strength-providing fibers and whiskers, when these are provided. Filler materials of relatively small particle size are preferred, the preferred particle size range being from 0.01 to 50 micrometers. As described above, the presence of particles of filler material of a range comprising different sizes is preferred, since this improves the capability of dense packing in a manner that reduces the interstitial volume, and consequently facilitates the production of the very thin highly adhesive layers that are characteristic of the invention, besides reducing the amount of polymer required to fill the interstices and adhere the particles together. It can be shown theoretically that the minimum interstitial volume that can be obtained when packing spheres of uniform size is about 45%. Owing to the wider particle size distribution that can be employed, this volume can be reduced considerably further, down to the specified value of about 3%.

The methods of this invention are particularly applicable to the production of composite materials in which the finely powdered filler material consists of any one or a mixture of the "advanced" materials that are now used in industry for the production of fired ceramic substrates for electronic circuits, the most common of which are aluminium nitride; barium titanate; barium-neodymium titanate; barium copper tungstate; lead titanate; lead magnesium niobate; lead zinc niobate; lead iron niobate; lead iron tungstate; strontium titanate; zirconium tungstate; the chemical and/or physical equivalents of any of the foregoing; alumina; fused quartz; boron nitride; metal powders; and semiconductors. Another important group is compositions comprising powdered ferrites and like inductive materials in a polymer matrix have already been produced, used for example in magnetic passive products such as transformers, inductors and ferrite core devices, but the methods used add the powdered filler material into the polymer matrix and their solids contents have generally been limited to not more than about 50% by volume. The invention permits the production of such composite materials of higher solids content, e.g. 80% by volume and above.

While the specification describes particular embodiments of the present invention, those of ordinary skill can devise variations of the present invention without departing from the inventive concept.

We claim:

1. Articles consisting of bodies of composite materials comprising finely powdered filler material particles distributed in a polymer matrix;

wherein each body comprises a composite mixture of filler material particles and the balance polymer, the polymer being one which is soluble in a volatilizable solvent that has been volatilized from the mixture;

wherein each body comprises a stack of a plurality of united thin coherent layers in number sufficient to provide a unitary body of the desired thickness; and wherein the body has been formed from the stack of thin coherent layers by subjecting the stack to a temperature sufficient to melt the polymer and to a pressure sufficient to unite the thin coherent layers into a unitary body and disperse the melted polymer into the interstices between the filler material particles.

2. Articles as claimed in claim 1, wherein body of composite material has been formed from a stack of thin coherent layers of thickness from 0.0125 mm (0.0005 in) to 0.01 mm (0.004 (in).

3. Articles as claimed in claim 1, wherein the body of composite material has been formed from a stack of from 6 to 120 thin coherent layers.

4. Articles as claimed in claim 1, wherein the filler material particles selected from the group comprising particles of inorganic material, particles of electromagnetic material, particles of a core of inorganic material covered with a layer of a metal oxide material, particles of metal material, particles of magnetic material, and particles of low dielectric constant high melting point polymer material, all of which particles may be hollow.

5. Articles as claimed in claim 4, wherein the filler material particles are of size in range 0.1 to 50 micrometers, and consist of a mixture of filler material particles of different chemical compositions.

6. Articles as claimed in claim 1, and comprising a layer of conductive metal applied to a surface of the body by sputtering or by direct bonding of conductive metal foil under heat and pressure in a vacuum.

7. Articles as claimed in claim 1, and comprising substrates for electronic circuits formed from the heated and pressurized composite mixture.

8. Articles as claimed in claim 1, wherein the melted polymer is dispersed substantially uniformly into the interstices between the filler material particles.

* * * * *